(12) United States Patent
Williams et al.

(10) Patent No.: US 8,371,532 B2
(45) Date of Patent: Feb. 12, 2013

(54) AIRCRAFT JOINT

(75) Inventors: Jeremy Thomas Williams, Bristol (GB); Richard Oldfield, Bristol (GB); David Hatts, Bristol (GB)

(73) Assignee: Airbus Operations Limited, Bristol (GB)

( * ) Notice: Subject to any disclaimer, the term of this patent is extended or adjusted under 35 U.S.C. 154(b) by 583 days.

(21) Appl. No.: 12/693,157

(22) Filed: Jan. 25, 2010

(65) Prior Publication Data

US 2011/0089292 A1    Apr. 21, 2011

(30) Foreign Application Priority Data

Jan. 26, 2009    (GB) .................................. 0901228.7

(51) Int. Cl.
*B64C 1/06* (2006.01)
(52) U.S. Cl. ..................................... 244/131; 244/123.7
(58) Field of Classification Search .................. 244/131, 244/123.7, 124
See application file for complete search history.

(56) References Cited

U.S. PATENT DOCUMENTS

| | | | | |
|---|---|---|---|---|
| 3,004,645 A | * | 10/1961 | Moul, Jr. ........................ | 244/131 |
| 3,219,158 A | * | 11/1965 | Carter et al. ...................... | 52/84 |
| 7,546,979 B1 | * | 6/2009 | Estell et al. ................. | 244/123.1 |
| 7,975,965 B2 | * | 7/2011 | Ackermann et al. .......... | 244/124 |
| 8,262,025 B2 | * | 9/2012 | Coulter et al. .............. | 244/123.1 |
| 2007/0051851 A1 | * | 3/2007 | Ruffin et al. .................... | 244/131 |
| 2007/0147953 A1 | | 6/2007 | Garcia Sacristan | |
| 2011/0147521 A1 | * | 6/2011 | Delahaye et al. ............. | 244/119 |

FOREIGN PATENT DOCUMENTS

| | | |
|---|---|---|
| GB | 876438 | 8/1961 |
| WO | 2007020049 A1 | 2/2007 |
| WO | 2008105805 A2 | 9/2008 |

OTHER PUBLICATIONS

UK Search Report for GB0901228.7 dated May 22, 2009.

* cited by examiner

*Primary Examiner* — Christopher P Ellis
(74) *Attorney, Agent, or Firm* — Lowe, Hauptman, Ham & Berner, LLP

(57) ABSTRACT

A method of joining a wing to an aircraft fuselage by forming a series of pinned lug joints between a fuselage side and a wing side of a wing box structure. The joint forming process includes providing a single row of lugs on one side of the joint to be formed, and providing a respective double row of lugs on the other side of the joint to be formed. A gap between opposing lugs of the double row varies along the row. The wing side and the fuselage side of the wing box structure are brought together such that the lugs of the single row are located within the respective gaps between opposing lugs of the double row, and the lugs are pinned to form the series of pinned lug joints. Also, a joint formed by the method.

16 Claims, 6 Drawing Sheets

AIRCRAFT JOINT

RELATED APPLICATIONS

The present application is based on, and claims priority from, British Application Number 0901228.7, filed Jan. 26, 2009, the disclosure of which is hereby incorporated by reference herein in its entirety.

FIELD OF THE INVENTION

The present invention relates to an aircraft wing-fuselage joint.

BACKGROUND OF THE INVENTION

Aircraft wing to fuselage joints need to be lightweight and low cost to produce and maintain. Increasingly in the current aircraft industry, the time to assemble such joints is also a key driver, as manufacturers face the challenge of greater production rates to meet demand. Specifically, the time to assemble large aircraft assemblies (e.g. wing to fuselage) is of financial interest, due to the large cost of the work in progress locking in cash to the business at the final assembly line.

Most large aircraft have a two-spar wing box structure, and the wing-fuselage joint connects the centre wing box structure on the fuselage side to the wing box structure on the wing side. Of course, two such joints are provided, one on each side of the fuselage. The wing-fuselage joint typically comprises a series of joints around the circumference of the wing box structure. On the fuselage side, the joint typically connects to upper and lower tri-form, or cruciform, components and to front and rear spars of the centre wing box structure. On the wing side, the joint typically connects to upper and lower wing covers, and to front and rear wing spars of the wing box structure.

Traditionally, weight-optimised wing-fuselage joint designs focus on shear joints, where surfaces of components are overlapped and then bolted together; or tension joints, where surfaces of components are butted together and secured with tension bolts (often via a bracket). Typically, tension joints are heavier than their shear-joint equivalents due to the inefficient way that load is transferred. However, shear joints typically take longer to assemble than tension equivalents due to the large number of bolts required and the accuracy required in matching the positions of overlapping surfaces around the joint perimeter. Currently, it takes around 50-100 hours to form a wing-fuselage joint for a medium/large aircraft by forming shear joints in composite structures.

SUMMARY OF THE INVENTION

A first aspect of the invention provides an aircraft wing-fuselage joint, comprising a series of pinned lug joints between a fuselage side and a wing side of a wing box structure, wherein a single row of lugs is provided on one side of the joint, and a respective double row of lugs is provided on the other side of the joint, and wherein a gap between opposing lugs of the double row varies along the row.

A further aspect of the invention provides a method of joining a wing to an aircraft fuselage by forming a series of pinned lug joints between a fuselage side and a wing side of a wing box structure, the joint forming process including:

providing a single row of lugs on one side of the joint to be formed, and providing a respective double row of lugs on the other side of the joint to be formed, wherein a gap between opposing lugs of the double row varies along the row;

bringing the wing side and the fuselage side of the wing box structure together such that the lugs of the single row are located within the respective gaps between opposing lugs of the double row; and pinning the lugs to form the series of pinned lug joints.

This attachment philosophy reduces the number of bolts required to pin the joint and allows greater tolerance between the components to be joined compared with shear joints, and so reduces the time required for forming the wing-fuselage joint. Furthermore, the attachment loads remain in-plane, making it weight competitive compared with tension joints.

Due to the way in which aircraft wings are typically joined to the fuselage as large assemblies, the aircraft-fuselage joint is formed by bringing together the wing and fuselage having the rows of lugs and then pinning the lugs. Bringing the wing and fuselage together such that the lugs of each side of the joint align along the row so that a series of pinned lug joints can be formed is a non-trivial problem. Where the wing and fuselage are large assemblies, they must be brought together along a single insertion vector at an angle with respect to the horizontal plane and an angle with respect to the vertical plane. Large aircraft wings often have significant sweep, dihedral/anhedral and local curvature at the wing root. Accordingly, the local wing geometry adjacent each lug can vary substantially around the circumference of the wing-fuselage joint. The gap between opposing lugs of the double row therefore preferably varies along the row in dependence on the local wing geometry.

The gap between opposing lugs of the double row may also be varied to accommodate variation in local loads which the series of pinned lugs has to support. For example, some pinned lugs of the joint may experience higher loads than others and so the thickness of material used to form the more highly loaded lugs may be appropriately increased. This then has a knock-on effect on the gap between opposing lugs of the double row, which gap is correspondingly increased.

The gap between opposing lugs of the double row should always be as small as possible since a larger gap than necessary would cause increased pin bending which would require larger, and so heavier, pins to support the increased bending loads.

Whilst, for ease of assembly, it is preferable that the double row of lugs is provided around the entire circumference of the wing box structure, it may not be beneficial to do so if this would require excessive gaps between some opposing lugs of the double row. This may occur if the local wing loads or geometry vary widely around the circumference of the wing box structure. In this instance it is more preferable instead that the double row of lugs is provided around only a portion of the circumference and a first single row of lugs is provided around the remainder of the circumference. Then, after the step of bringing the wing side and the fuselage side of the wing box structure together, a lug plate having a second single row of lugs can be attached adjacent the first single row of lugs such that the first and second single rows form a double row of lugs on the other side of the joint to be formed.

Preferably, the series of pinned lug joints of the wing-fuselage joint extends around the entire circumference of the wing box structure, regardless of whether an additional lug plate is required.

In a preferred embodiment of this invention, the double row of lugs is provided on the fuselage side and is made of metal, and the single row of lugs is provided on the wing side and is made of composite material. In this way the lugs on the wing side may be integrally formed with upper and/or lower composite wing covers of the wing. This invention is well suited to the use of composite materials, which have higher tolerances than their metallic counterparts. This is much less of an issue with pinned lug joints, as there is no clamping across the joint, when compared with shear or tension joints.

The double row of lugs may alternatively be provided on the wing side and the single row of lugs may be provided on the fuselage side. This construction may particularly be used where the wing covers have a sandwich construction such that double lugs may be integrally formed in extensions of the skins of the composite sandwich, beyond the core. Of course, an all composite or all metallic lug construction may be used for the joint.

To ease assembly issues arising from manufacturing tolerances at least some of the lugs may include eccentric bushes. These bushes may be rotated, where necessary, to align the lugs on each side of the joint prior to pinning. This would reduce or negate the requirement for drilling out of the lugs in the final assembly, which currently occupies a significant amount of the total time to form a wing-fuselage joint by conventional shear joints. It is envisaged that a wing-fuselage joint in accordance with this invention may be formed in around 10 hours.

Since pinned lug joints do not clamp the connected components, there is a possibility that some unwanted local deflection may be observed in the wing-fuselage joint. This may particularly occur in the vicinity of the centreline of the wing where the lugs are formed integrally with the upper and lower wing covers, which are much less stiff than, say, the wing spars. Such deflection is undesirable as it may reduce the aerodynamic efficiency of the wing, cause fatigue in any fairing structures which cover the wing-fuselage joint, and disrupt rigid connections between the wing and the fuselage. To combat this problem, one or more structural connections may be made between a wing rib and a wing cover or spar adjacent the pinned lug joints. The structural connection is preferably a tie rod, but in the alternative may be an overlapping shear joint, or another lug joint.

BRIEF DESCRIPTION OF THE DRAWINGS

Embodiments of the invention will now be described with reference to the accompanying drawings, in which.

DETAILED DESCRIPTION OF EMBODIMENTS

Figure 1:
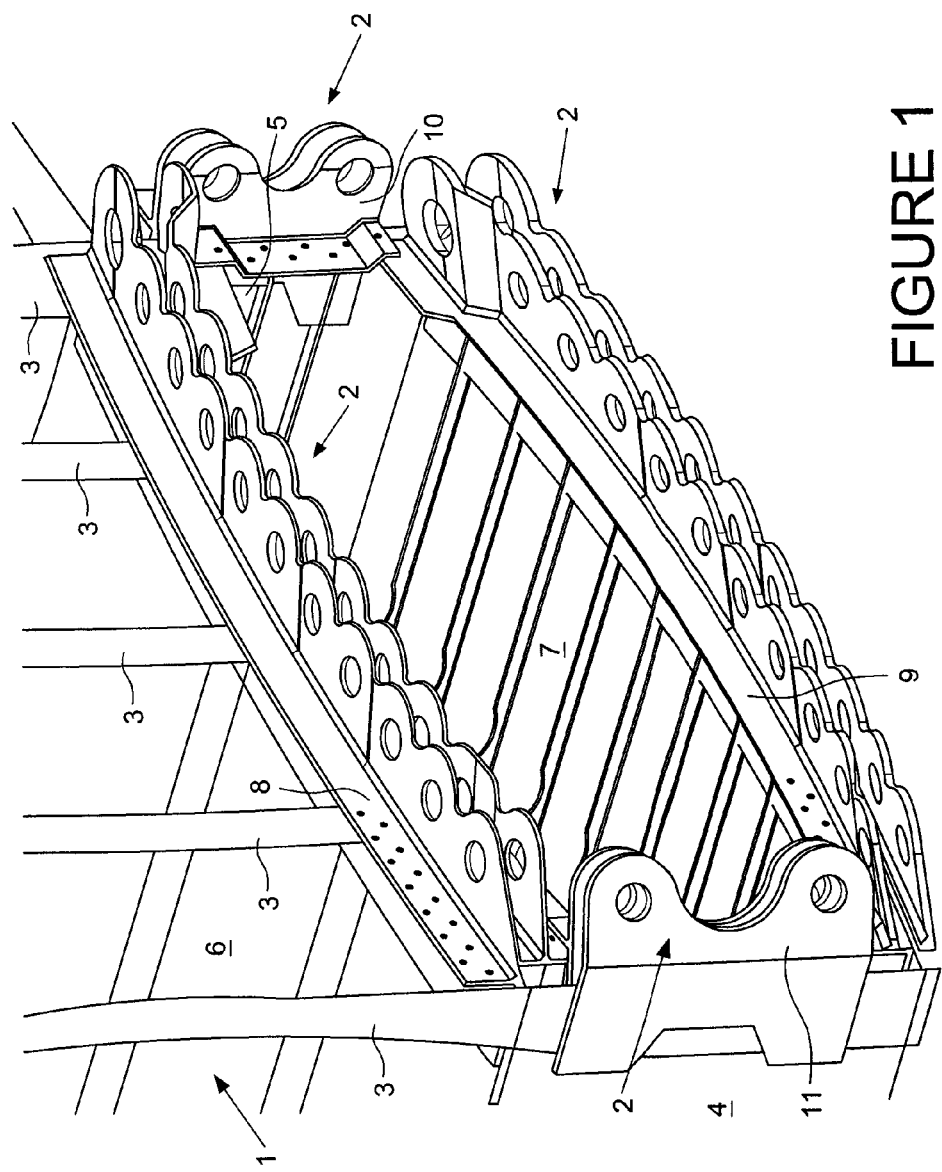
FIG. 1 shows a series of lugs around the circumference of a wing box structure on a fuselage side of an aircraft wing-fuselage joint to be formed in accordance with a first embodiment.
Figure 5A:
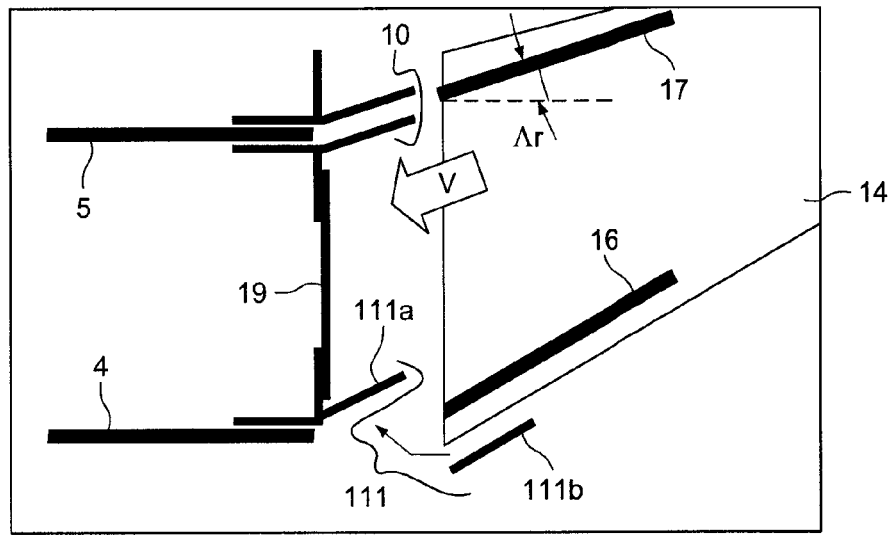
FIG. 5 a) shows a cross section top-down schematic diagram of a method of joining a wing to a fuselage in accordance with the second embodiment; and b) shows a corresponding cross section view looking aft along the fuselage longitudinal axis.

FIG. 1 shows a partial view of a centre wing box structure 1 having a series of double lugs 2 provided around the entire circumference of the centre wing box structure 1 prior to connection to an aircraft wing (not shown) to form a wing-fuselage joint. The centre wing box structure 1 is connected to fuselage structural frames 3 which run around the circumference of the fuselage. The centre wing box structure 1 comprises a front spar 4, a rear spar 5, an upper cover 6 and a lower cover 7. At each end of the centre wing box structure 1 there is provided a centre wing box rib 19 (not shown in FIG. 1 for clarity, but shown in FIGS. 5a, 5b and 6).

The upper double row of lugs is formed in an upper "cruciform" component 8 which is attached by its inboard flange to the centre wing box upper cover 6; by its upper flange to the fuselage structural frames 3; and by its lower flange to the centre wing box rib 19 (not shown in FIG. 1). The upper double row of lugs 2 is formed in first and second outboard flanges of the cruciform component 8. In the structure shown in FIG. 1, the cruciform component 8 is actually constructed of two back-to-back "tri-form" components joined together prior to attaching the wing (not shown), but the cruciform component 8 may be a single component.

The lower double row of lugs is formed in a lower "tri-form" component 9. The tri-form component 9 has an inboard flange connected to the centre wing box lower cover 7; and by its upper flange to the centre wing box rib 19 (not shown in FIG. 1). The lower double row of lugs 2 is formed on first and second outboard flanges of the tri-form component 9.

The aft double row of lugs is formed in an aft cruciform component 10. The cruciform component 10 is connected by its inboard flange to the centre wing box rear spar 5; and by its forward flange to the centre wing box rib 19 (not shown in FIG. 1). The aft double row of lugs 2 is formed on first and second outboard flanges of the cruciform component 10. The cruciform component 10 shown in FIG. 1 has an aft flange, although this may not be required and so the cruciform component 10 could be replaced by a tri-form component.

The forward double row of lugs is formed in a forward tri-form component 11. The tri-form component 11 is connected by its inboard flange to the centre wing box front spar 4; and by its aft flange to the centre wing box rib 19 (not shown in FIG. 1). The forward double row of lugs 2 is formed on first and second outboard flanges of the tri-form component 11.

Note that the tri-form and cruciform components 8, 9, 10, 11 may each be a single component, or may be formed from multiple components joined together.

The aircraft fuselage skin (not shown) is also connected to the upper flange of the upper component 8. The forward 11 and aft 10 components are also connected by their respective inboard flanges to the fuselage structural frames 3 which are connected to the centre wing box front and rear spars 4, 5.

The double lugs 2 formed on the cruciform and tri-form components 8, 9, 10, 11 form a series of double lugs around the entire circumference of each end of the centre wing box structure 1. The double lugs 2 form a series of female lugs on the fuselage side of the wing fuselage joint to be formed, and are adapted to receive a corresponding series of male lugs on the wing side of the joint.

Figure 2:
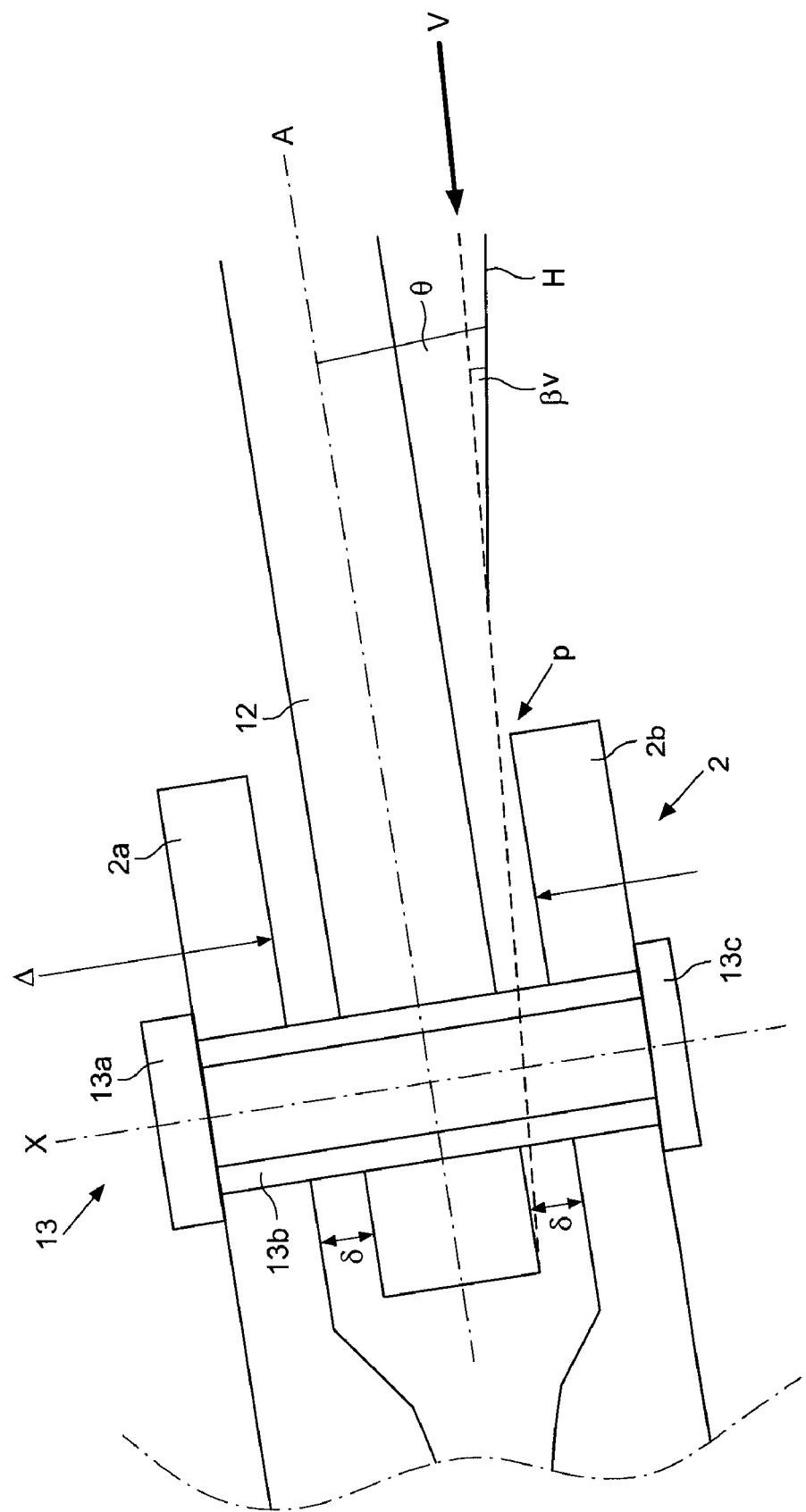
FIG. 2 shows a cross section through one pinned lug joint of an aircraft wing-fuselage joint.

FIG. 2 shows a cross section through one pinned lug joint of the completed aircraft wing-fuselage joint. The double lug 2 comprises first and second lugs 2a, 2b. Between the inner surfaces of the lugs 2a and 2b is a gap Δ. The gap Δ between the first and second lugs 2a, 2b of the female lug 2 receives the corresponding male lug 12. A pin 13 passes through the female lug 2 and the male lug 12 to connect the lugs 2, 12 together. Note that the thickness of the lug 12 is less than the gap Δ. This is to accommodate the male lug 12 as it is inserted into the female lug 2 during assembly of the wing-fuselage joint.

The male lug 12 is translated along vector V at angle βv with respect to the horizontal plane H so as to move the male lug 12 into the female lug 2, prior to insertion of the pin 13. When in its final position, the centre lines of the male 12 and female 2 lugs are coincident along axis A, and the local dihedral angle the axis A makes with respect to the horizontal plane H is angle θ. Note the clearance at point p between the trace of the lower surface of lug 12 (shown in dotted line) and the upper surface of lug 2b as the lug 12 is moved along vector V. Without the clearance at point p the lug 12 could not be inserted into female lug 2 along vector V.

However, the clearance at point p should be as small as possible within tolerances such that a gap δ between the upper surface of lug 12 and the lower surface of lug 2a, and a similar gap δ between the lower surface of the lug 12 and the upper surface of the lug 2b is as small as possible. The gaps δ are similar so that the lug 12 is positioned substantially intermediate the lugs 2a and 2b. The larger the gap δ the greater the bending in the pin 13 and so the larger the pin 13 must be to support the bending loads. The pin 13 is preferably as small as possible so as to save weight, and so the gap δ is also preferably as small as possible.

The pin 13 is a bolt having a head 13a, a hollow shaft 13b having a threaded surface at its end opposite the head end. A nut 13c is threadably engaged with the threaded end of the shaft 13b.

Figure 3:
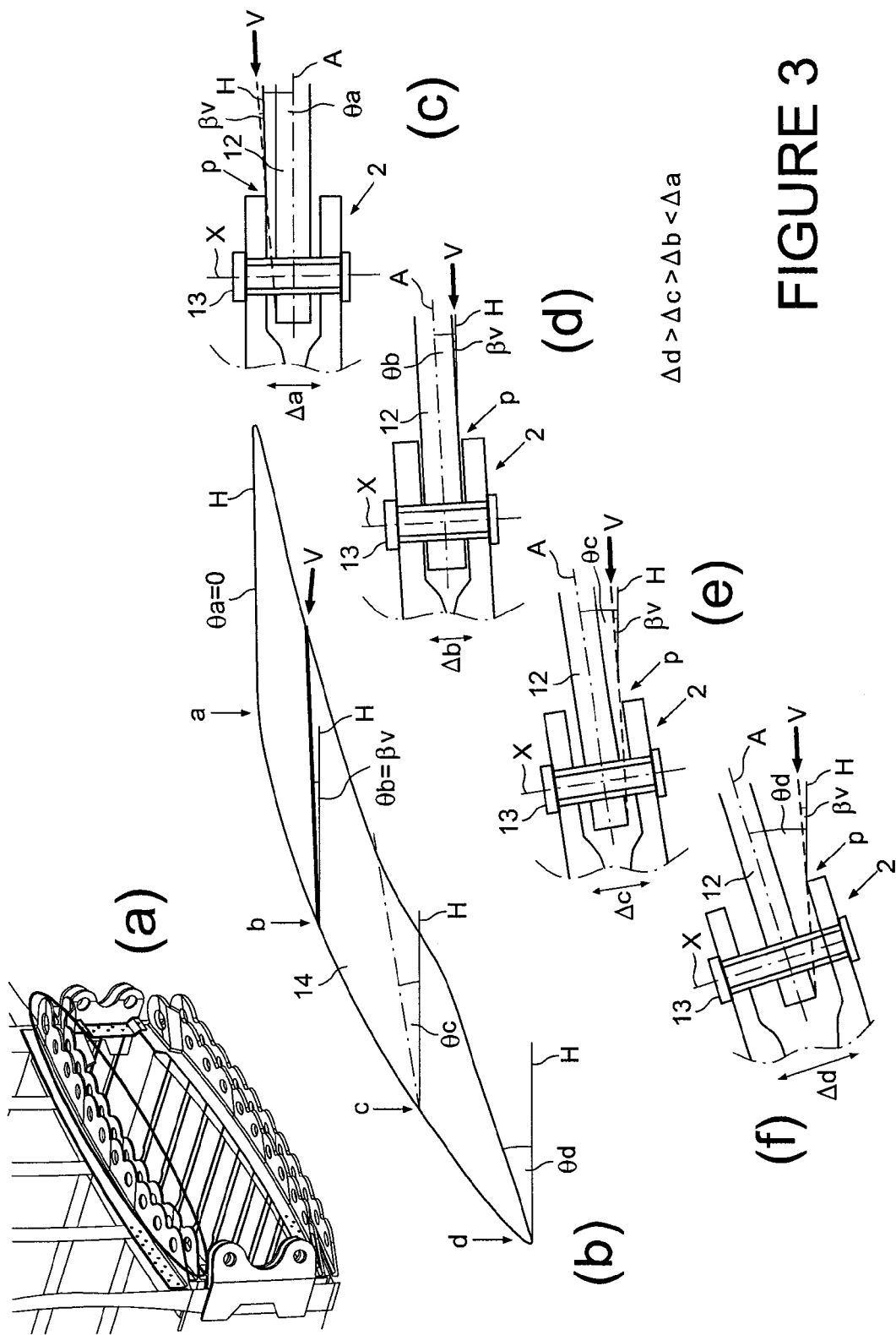
FIG. 3 a) shows the view of FIG. 1 with the upper double row of lugs circled; b) shows a wing upper cover and the variation in local dihedral across the wing root chord; and c) to f) show variation in the gap between opposing lugs of the upper double row of lugs of a) along the wing root chord in dependence on the local wing dihedral.

FIG. 3a) shows the view of FIG. 1 with the upper double row of lugs 2 circled. The male lugs 12, to be inserted into the respective upper row of female lugs 2, are integrally formed with an upper wing cover 14. Note that the lugs 12 are not shown in the upper wing cover 14 of FIG. 3b).

FIG. 3b) shows how the geometry of the upper wing cover 14 varies along the chord from trailing edge to leading edge, from points "a" to "d". At the trailing edge the local dihedral angle θa=0, and so is coincident with the horizontal plane H. The local dihedral angle θ increases along the chord from trailing edge to leading edge and so the angle θ increases such that θa<θb<θc<θd. The wing insertion vector V is chosen as the mean wing dihedral angle, θv. In this way, the series of male lugs 2 may be optimised such that the gap δ is small. In the example shown in FIG. 3b) the wing insertion vector V is chosen such that θv=θb.

FIGS. 3c) to f) show how the geometry of the upper row of female lugs 2 varies along the wing chord. As can be seen from FIG. 3d) the gap Δb between the lugs of the female lug 2 is smallest where the local dihedral angle θb equals the wing insertion vector angle with the horizontal, βv. As shown in FIG. 3f) the female lug 2 has the largest gap inter-lug gap Δd where the difference between the local dihedral angle θd and βv is greatest. The inter-lug gap Δd>Δc>Δb<Δa.

Whereas in FIGS. 3d) to f) the critical clearance point p is between lug 2b (see FIG. 2) and lug 12, at point "a" the critical clearance point p is between the lug 2a (see FIG. 2) and lug 12 as shown in FIG. 3c). Note that due to the single wing insertion vector V, the angle βv between the wing insertion vector V and the horizontal plane H is constant across the wing chord.

The inter-lug gap Δ between opposing lugs of the upper row of female lugs varies along the row. As will be appreciated by those skilled in the art, the same considerations apply to the design of the lower row of female lugs formed in the component 9. However, the mean dihedral angle θ1 of the lower wing cover 15 is generally greater than the mean dihedral angle θu of the upper wing cover 14 at any position along the wing root chord.

Similar considerations apply to the wing box front spar 16 and the wing box rear spar 17 on the wing side of the joint and their attachment to the female lugs 2 of the components 10 and 11. Whereas the female lugs 2 of the components 8,9 are connected to male lugs 12 of the upper wing cover 14 and lower wing cover 15, respectively, the female lugs 12 of the components 10 and 11 are connected with male lugs 12 formed on the rear spar 17 and front spar 16, respectively, on the wing side of the joint.

The male lugs 12 are formed on the web of the front and rear spars 16, 17. The selection of the wing insertion vector V with respect to the vertical plane perpendicular to the fuselage longitudinal axis is similar to that for selection of the wing insertion vector V with respect to the horizontal plane H. That is to say, the wing insertion vector V is selected according to the mean sweep angle Λf of the front wing spar 16, and the mean sweep angle Λr of the rear spar 17, with respect to that vertical plane.

Therefore, the mean wing insertion vector V has components in both the vertical direction and also the fore/aft direction such that the wing insertion vector V is a truly three dimensional insertion vector. Due to the symmetry of aircraft, the wing insertion vector V on one side of the aircraft will be mirrored about a vertical plane coincident with the aircraft fuselage centre line for the other side of the aircraft. During final assembly of the aircraft, the wing side of the wing box structure is translated along the three dimensional insertion vector V so as to bring the wing side and the fuselage side of the wing box structure together such that the male lugs are located within their respective female lugs prior to pinning of the lugs to form the series of pinned lug joints that form the aircraft wing-fuselage joint.

Since the spar webs of the front and rear spars 16, 17 on the wing side of the joint are generally planar, there is no variation in the inter-lug gap of the female lugs 2 in components 10 and 11. However, the significant change in wing geometry along the wing root chord between the front and rear spars 16, 17 on both the upper 14 and lower 15 wing covers requires the variation in the inter-lug gap Δ of the upper and lower rows of female lugs 2 along the wing root chord.

In addition, the inter-lug gap Δ of the female lugs 2 may also be varied according to the local lows in each pinned lug joint. As can be seen in FIG. 1, the inter-lug gap Δ of the female lug nearest the trailing edge is larger than the inter-lug gap Δ of the female lugs along the remainder of the upper and lower rows. This is because the high loads carried by the rear spar 17 are too great to be transferred to the rear spar 5 of the centre wing box structure through component 10 alone.

Accordingly, the loads in the rear spar 17 are transferred to the rear spar 5 of the centre wing box structure by attachment of the web of the rear spar 17 to the female lugs 2 of component 10; and through the flanges of the rear spar 17 through the female lugs 2 of the upper and lower rows of double lugs nearest the trailing edge. The inter-lug gap Δ of the female lug 2 nearest the trailing edge on each of the upper and lower rows of female lugs is designed to accommodate both the thickness of the flange of the rear spar 17 and the thickness of either the wing cover 14 or 15. In this way, the inter-lug gap Δ of the female lugs 2 varies along the row in dependence upon the local load to be carried by the female lugs 2.

Due to the significant wing sweep and wing dihedral, or anhedral, of some aircraft, particularly large aircraft, it may not be beneficial to provide the double row of lugs 2 around the entire circumference of the wing box structure if this would require an excessive inter-lug gap Δ between some female lugs 2. In this instance it is more preferable instead that the female lugs 2 are fully formed only after insertion of the male lugs 12. To that end, the double row of lugs 2 is provided around only a portion of the circumference of the wing box structure 1, and a first single row of lugs is provided around the remainder of the circumference.

Figure 4:
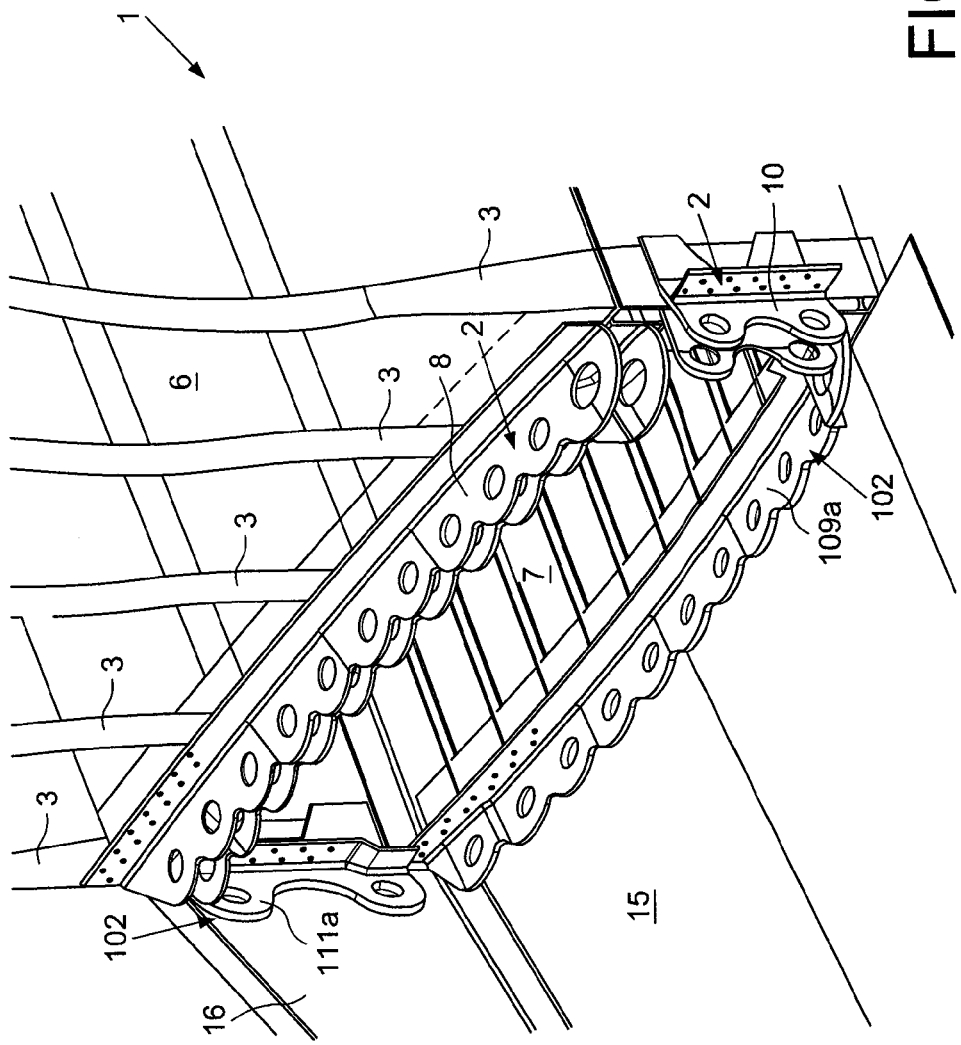
FIG. 4 shows a series of lugs around the circumference of a wing box structure on a fuselage side of an aircraft wing-fuselage joint to be formed in accordance with a second embodiment.

FIG. 4 shows a second preferred embodiment of the present invention in which like reference numerals denote like parts of the first embodiment. The only difference between the first and second embodiments is that the components 9 and 11, which each have a double row of lugs 2 in the first embodiment, are replaced by components 109 and 111, respectively, each having a first single row of lugs 102. As can be seen from FIG. 5a), the wing insertion vector V forms an angle with respect to the vertical plane perpendicular to the fuselage longitudinal axis equivalent to the sweep angle Λr of the wing rear spar 17. The sweep angle of the wing front spar 16 need not be taken into account in calculating this component of the wing insertion vector V.

Figure 5B:
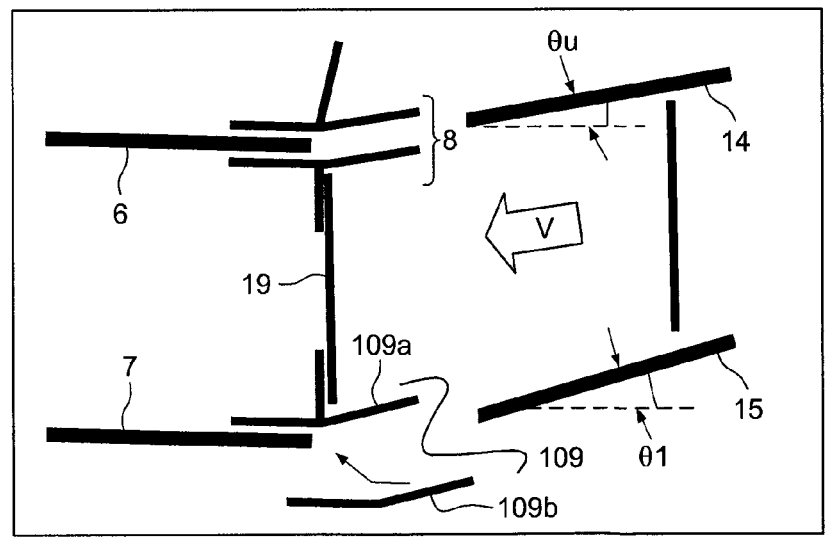

Similarly, as can be seen from FIG. 5b), the wing insertion vector V with respect of the horizontal planar H can be selected as the mean dihedral angle θu of the wing upper cover 14. The dihedral angle θ1 of the wing lower cover 15 need not be taken into account in calculating this component of the wing insertion vector V.

After the step of bringing the wing side and fuselage side of the wing box structure together, lug plates 109b and 111b each having a second single row of lugs can be attached adjacent to the first single row of lugs 102 such that the first and second single rows form rows of female lugs on the fuselage side of the joint. The component 109a and the lug plate 109b together form component 109, which is structurally equivalent to component 9 of the first embodiment. The component 111a and the lug plate 111b together form component 111, which is structurally equivalent to component 11 of the first embodiment.

Note that in the second embodiment, the tri-form and cruciform components formed of two parts joined together are formed after the wing side and fuselage side of the joint are brought together. This is in contrast to the first embodiment where the two-part tri-form and cruciform components are formed by joining the two parts together prior to bringing the wing side and fuselage side of the joint together.

Most commercial airliners, and many other aircraft, utilise the space within both the centre wing box structure and the wings as fuel tanks. Where the aircraft wing-fuselage joint is formed by shear or tension joints, the clamping effect of those joints ensures an air/liquid tight connection. By contrast, the pinned lug joints of the wing-fuselage joint in accordance with the present invention are deliberately not air/liquid tight. Accordingly, for the regions immediately adjacent to the wing-fuselage joint to be used as fuel tanks either a secondary tank must be formed within the interior volume of the wing box structure on both the fuselage and wing sides so as to seal the fuel tanks from the wing fuselage joint, or else the region immediately adjacent to the wing fuselage joint cannot be used as a fuel tank.

Figure 6:
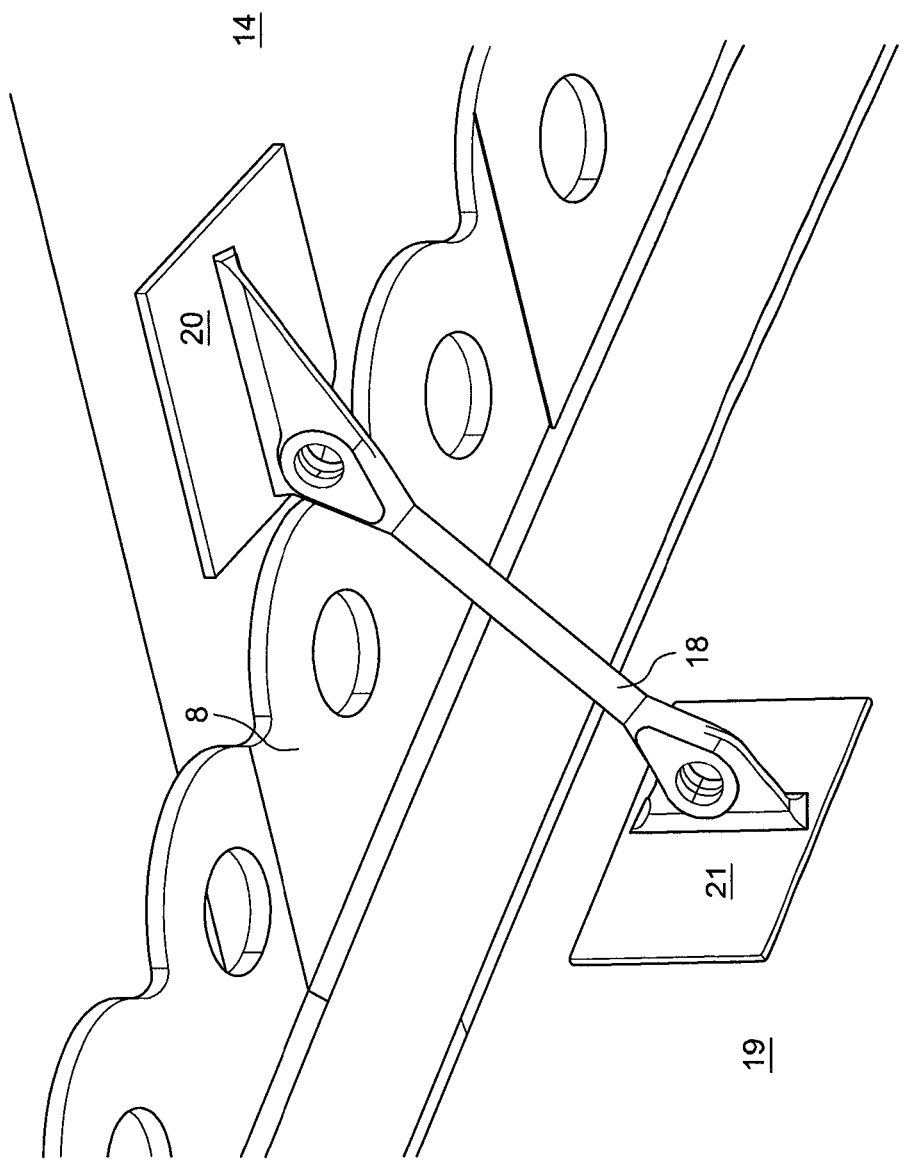
FIG. 6 shows a tie rod between a centre wing box rib and an upper wing cover adjacent a wing-fuselage joint.

Since the pinned lug joints do not clamp to connect the components, there is a possibility that some unwanted local deflection may be observed in the wing-fuselage joint. This may particularly occur in the vicinity of the centre line of the wing since the male lugs are integrally formed with the upper and lower wing covers, which are much less stiff than the wing spars. Such deflection is undesirable as it may reduce the aerodynamic efficiency of the wing, causing fatigue in any fairing structures which cover the wing-fuselage joint and disrupt rigid connections between the wing and the fuselage. To combat this problem, one or more tie rods may be connected between a wing rib and a wing cover or spar adjacent to the pinned lug joints. With reference to FIG. 6, a typical tie rod 18 is shown connecting between the centre wing box rib 19 on the fuselage side and the upper wing cover 14 on the wing side. The tie rod 18 is pinned at its ends to brackets 20,21 connected to the wing upper cover 14 and the centre wing box rib 19, respectively.

In the embodiments described above, the wing box structure on the wing side of the joint is made of composite material, preferably carbon-fibre reinforced plastic, and the centre wing box structure on the fuselage side of the joint is made of metal, preferably aluminium. However, it will be appreciated by those skilled in the art that the invention is also applicable to all composite, or all metal, joints; or the male lugs may be of metal and the female lugs of composite.

To ease assembly issues arising from manufacturing tolerances at least some of the lugs may include eccentric bushes. These bushes may be rotated, where necessary, to align the lugs on each side of the joint prior to pinning. This would reduce or negate the requirement for drilling out of the lugs in the final assembly.

Although the invention has been described above with reference to one or more preferred embodiments, it will be appreciated that various changes or modifications may be made without departing from the scope of the invention as defined in the appended claims.

The invention claimed is:

1. An aircraft wing-fuselage joint, comprising a series of pinned lug joints between a fuselage side and a wing side of a wing box structure, wherein a single row of lugs is provided on one side of the joint, and a respective double row of lugs is provided on the other side of the joint, and wherein a gap between opposing lugs of the double row varies along the row.

2. A joint according to claim 1, wherein the gap is varied along the row in dependence on the local wing geometry.

3. A joint according to claim 1, wherein the double row of lugs is provided on the fuselage side and the single row of lugs is provided on the wing side.

4. A joint according to claim 1, wherein the double row of lugs is of metal and the single row of lugs is of composite material.

5. A joint according to claim 1, wherein the lugs on the wing side are integrally formed with upper and/or lower wing covers of the wing.

6. A joint according to claim 1, wherein at least some of the lugs include eccentric bushes.

7. A joint according to claim 1, further comprising one or more tie rods between a wing rib and a wing cover or spar adjacent the pinned lug joints.

8. A method of joining a wing to an aircraft fuselage by forming a series of pinned lug joints between a fuselage side and a wing side of a wing box structure, the joint forming process including:
providing a single row of lugs on one side of the joint to be formed, and providing a respective double row of lugs on the other side of the joint to be formed, wherein a gap between opposing lugs of the double row varies along the row;

bringing the wing side and the fuselage side of the wing box structure together such that the lugs of the single row are located within the respective gaps between opposing lugs of the double row; and pinning the lugs to form the series of pinned lug joints.

9. A method according to claim 8, wherein the gap is varied along the row in dependence on the local wing geometry.

10. A method according to claim 8, wherein the double row of lugs is provided on the fuselage side and the single row of lugs is provided on the wing side.

11. A method according to claim 8, wherein the wing side and the fuselage side of the wing box structure are brought together by relative movement along a predetermined insertion vector.

12. A method according to claim 8, wherein around the circumference of the wing box structure on the other side of the joint to be formed, the double row of lugs is provided around a portion of the circumference and a first single row of lugs is provided around the remainder of the circumference.

13. A method according to claim 12, wherein after the step of bringing the wing side and the fuselage side of the wing box structure together, the method further comprises attaching a lug plate having a second single row of lugs adjacent the first single row of lugs such that the first and second single rows form a double row of lugs on the other side of the joint to be formed.

14. A method according to claim 8, wherein at least some of lugs include eccentric bushes, and the method further comprises rotating the eccentric bushes, where necessary, to align the lugs on each side of the joint prior to pinning.

15. A method according to claim 8, wherein the step of pinning the lugs comprises forming the series of pinned lug joints around the entire circumference of the wing box structure.

16. A method according to claim 8, further comprising connecting one or more tie rods between a wing rib and a wing cover or spar adjacent the pinned lug joints.

* * * * *